March 29, 1960     D. C. ROLLER ET AL     2,930,470
REEL MECHANISM FOR TYPEWRITER RIBBONS
Filed Nov. 24, 1958     3 Sheets-Sheet 1

INVENTORS
DONALD C. ROLLER
THOMAS T. HAND
BY Ralph C. Dustin
ATTORNEY

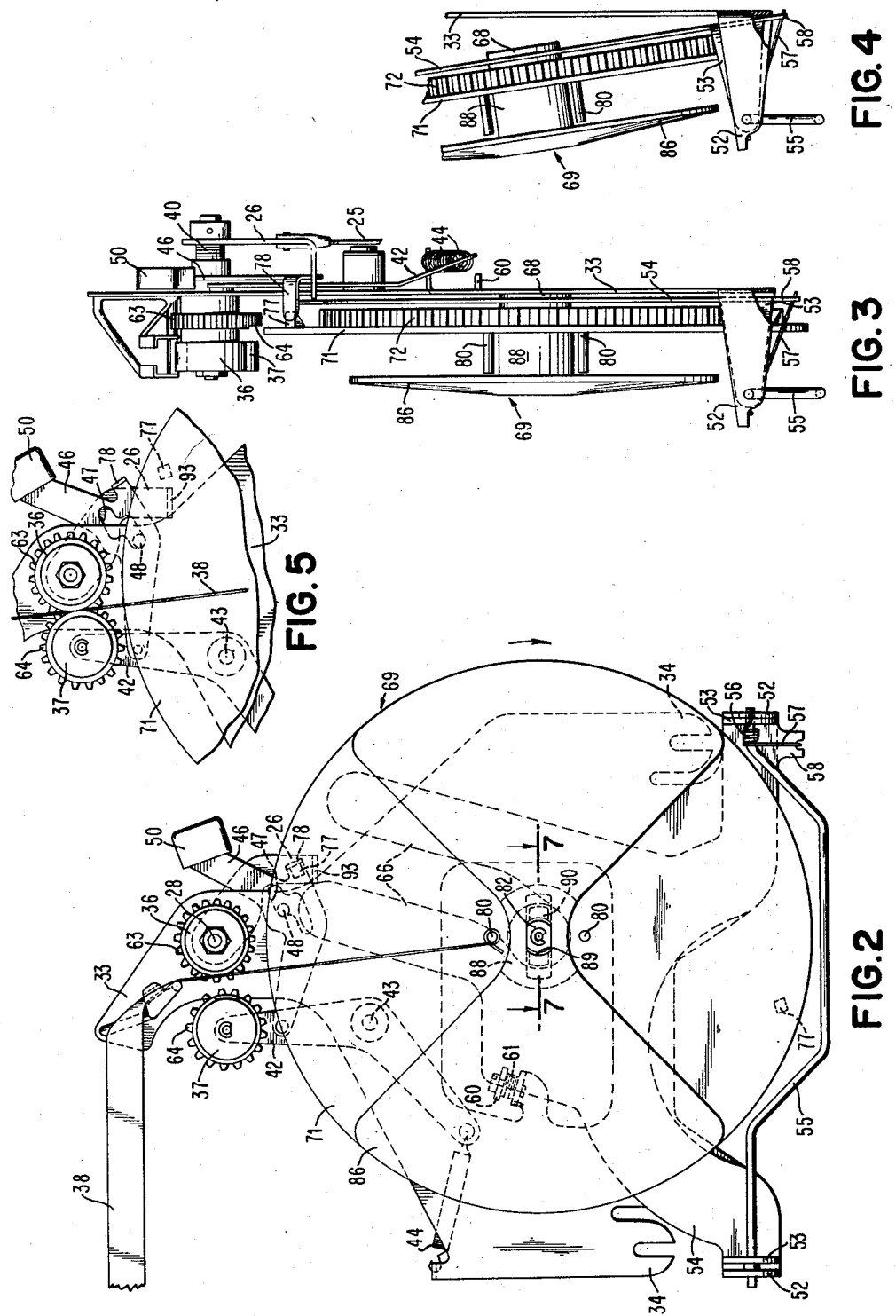

March 29, 1960 D. C. ROLLER ET AL 2,930,470
REEL MECHANISM FOR TYPEWRITER RIBBONS
Filed Nov. 24, 1958 3 Sheets-Sheet 3

United States Patent Office 2,930,470
Patented Mar. 29, 1960

2,930,470
REEL MECHANISM FOR TYPEWRITER RIBBONS

Donald C. Roller and Thomas J. Hand, Lexington, Ky., assignors to International Business Machines Corporation, New York, N.Y., a corporation of New York Application November 24, 1958, Serial No. 775,758

10 Claims. (Cl. 197—151)

This invention relates to reel mechanisms for typewriter ribbons, and more particularly to mechanisms for winding up a ribbon as it passes through a typewriter.

There is shown in Patent 2,734,614, issued to R. E. Page, a mechanism for feeding a carbon ribbon in response to the actuation of type keys on a power driven typewriter. The present invention is directed to a reel mechanism which is operable to wind up a ribbon as it is fed by means such as that of the Page patent. This mechanism comprises a reel which is urged continuously by frictional driving means in a direction to wind up the ribbon. When the reel is full, a button may be actuated to move feed rolls away from each other and at the same time release a latch so that a supporting frame for the reel swings outwardly, disengaging drive connections to the reel and placing the latter in a position to be removed from the frame. The reel is so constructed that the ribbon may be easily removed therefrom to permit use of the reel again for winding up more ribbon. When the empty reel is placed in the frame and the latter is swung inwardly to its latched position, driving connections to the reel are again completed and cause it to be driven until a lug on the reel engages a stop, at which time the reel is in a position to receive the ribbon from the feed rolls. Actuation of the first type key results in a removal of the stop from the path of the lug and a reengagement of the feed rolls.

An object of this invention is to provide an improved reel mechanism for winding up a typewriter ribbon.

Another object is to provide a reel which is urged by driving means in a direction to take up ribbon as it is fed from a typewriter, the reel being supported by a frame which is movable from an operative to an inoperative position, and the connections to the driving means being broken when the frame is moved to its inoperative position.

Still another object is to provide an improved reel structure adapted for use with a typewriter.

Yet another object is to provide an improved mounting and control means for a ribbon take-up reel.

Other objects of the invention will be pointed out in the following description and claims and illustrated in the accompanying drawings, which disclose by way of examples the principle of the invention and the best mode which has been contemplated for applying that principle.

In the drawings:

Fig. 2 is an elevational view taken from the left end of Fig. 1 and showing the reel just after movement to operating position with the ribbon connected thereto.

Fig. 3 is an elevational view taken at right angles to Fig. 2.

Fig. 4 is a fragmentary view similar to Fig. 3, but showing the reel tilted away from its supporting mechanism to an inactive position.

Fig. 5 is a fragmentary elevational view similar to Fig. 2, but showing the feed rolls in engagement with the ribbon, and the reel released for winding operation.

Figure 1:
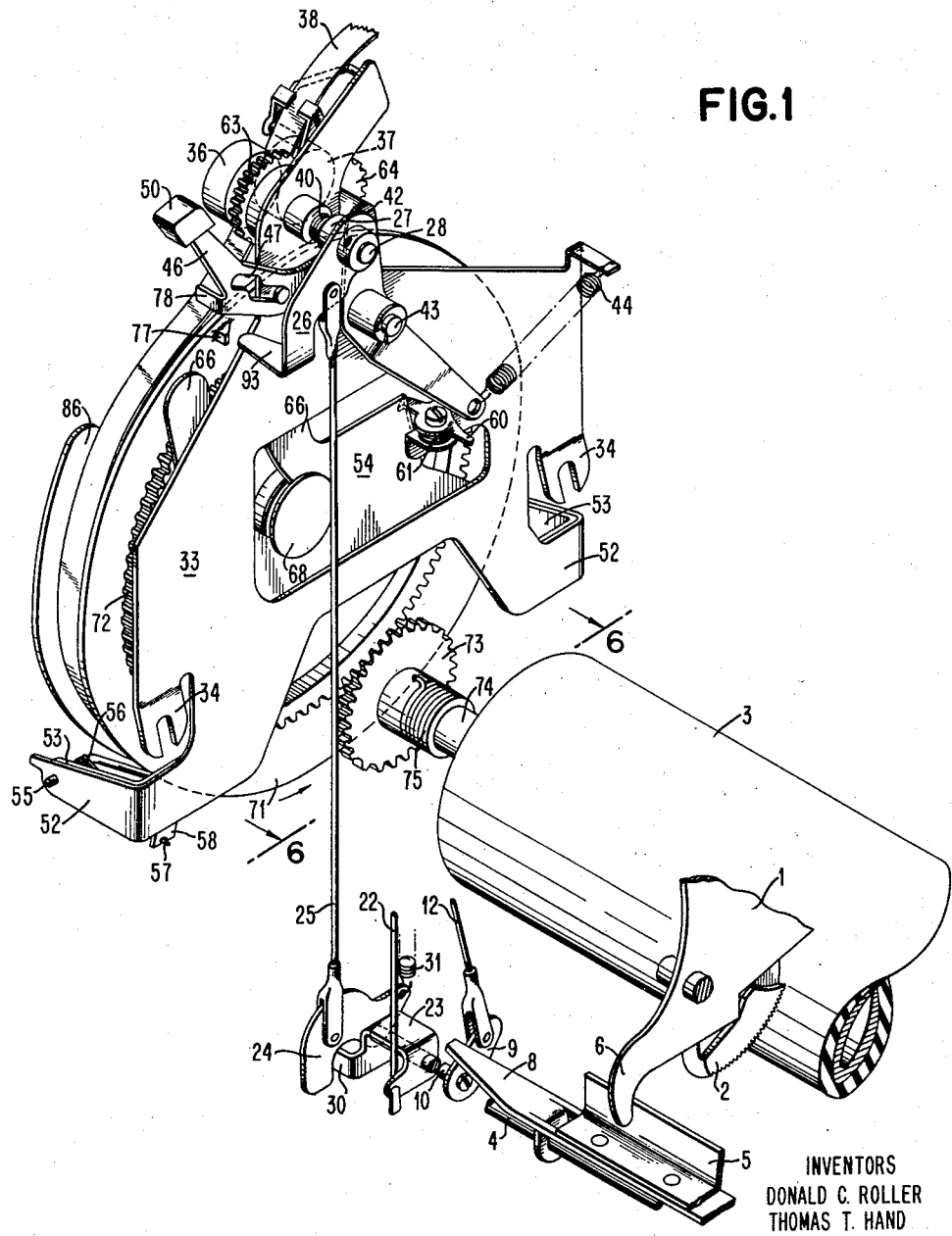
Fig. 1 is a perspective view showing the improved reel mechanism in position to receive ribbon from feed rolls which are driven intermittently, and driving means acting to urge the reel continuously in a winding direction.

Referring to the drawings, and more particularly to Fig. 1, it will be noted that there is shown a mechanism, substantially like that of the Page patent mentioned above, for feeding a ribbon of a power driven typewriter. As usual in such machines, each type bar is actuated by a sub-lever 1 when a cam 2 associated therewith is moved into engagement with a power roll 3 by operation of a key lever, not shown. Extending parallel to the power roll is a shaft 4 upon which a vane 5 is mounted for rotation relative thereto. Each of the sub-levers 1 is provided with a tail portion 6 which engages the vane 5 and rocks the latter about the shaft 4 during the driving of a type bar.

Figure 6:
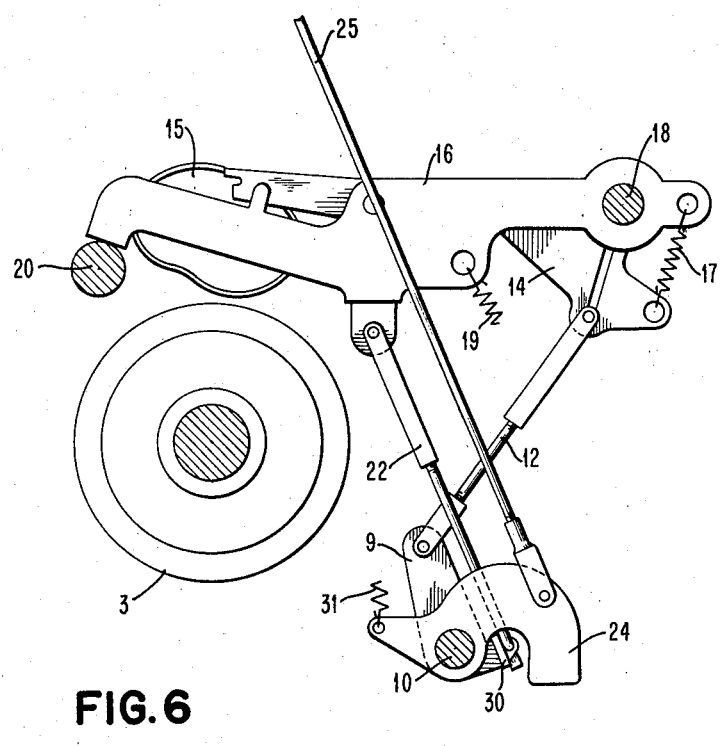
Fig. 6 is a sectional view taken on the plane of the line 6—6 of Fig. 1.

Extending from the left end of the vane 5 is a finger 8 engaging an arm 9 loosely mounted on a stub shaft 10 supported by the side frame, not shown, of the typewriter. Connected to the outer end of the arm 9 is a link 12 which is attached at its opposite end, as shown in Fig. 6, to a trip lever 14 for a cam 15 rotatably supported by a frame 16. The lever 14 is biased by a spring 17 to a position in which it normally holds the cam 15 out of engagement with the power roll 3. The frame 16 is pivotally supported at 18 and is normally held by a spring 19 in a position with its rear end in engagement with a stud 20. When the vane 4 is rocked, the finger 8 swings the arm 9 to rock the trip lever 14 and release the cam 15 for engagement with the power roll 3. Cam 15 is rotated by the power roll and causes the frame 16 to swing upwardly and back about the pivot 18.

Connected to the frame 16 is a link 22 which is attached at its other end, as shown in Fig. 1, to a member 23 rotatably supported by the stub shaft 10. Pivotally mounted on the shaft 10 adjacent the member 23 is a U-shaped member 24 which is connected by a link 25 to an arm 26 fixed to a bushing 27 rotatably mounted on a shaft 28. Formed on the member 23 is an arm 30 underlying the U-shaped member 24 and operating to swing the latter upwardly about the shaft 10 against the action of a spring 31.

The shaft 28 is rotatably supported by a plate 33 having notched arms 34 engageable with studs on the typewriter side frame and held in place by nuts, not shown. Fixed to the shaft 28 is a feed roll 36 which cooperates with a feed roll 37 for feeding a typewriter ribbon 38. A clutch spring 40 cooperates with the bushing 27 and the shaft 28 to cause a stepped rotation of the latter in a counterclockwise direction in Fig. 2 as the bushing is oscillated by a swinging of the arm 26. The feed roll 37 is rotatably supported by a bellcrank 42 mounted on a pivot stud 43 extending from the plate 33, and a spring 44 continuously urges the bellcrank in a direction to engage the feed roll 37 with the feed roll 36. Pivotally connected to the bell crank 42 is a latch member 46 having an S-shaped slot 47 through which a stud 48 on the plate 33 extends. A button 50 is provided on the latch member for moving the latter manually to the position shown in Fig. 2, thereby moving the feed roll 37 out of engagement with the feed roll 36 and engaging the stud 48 with a shoulder on the latch between the ends of the slot 47. The feed roll 37 is then held free of the roll 36 until the latch member is lifted away from the stud 48, and the spring 44 rocks the bellcrank to the position shown in Fig. 5.

At the lower edge of the plate 33 are two arms 52 extending outwardly from the side of the typewriter. Lying between these arms closely adjacent thereto are two more arms 53 formed on a reel supporting frame 54. A rod 55 is supported at its ends by the arms 52 and extends through the arms 53 to provide a pivotal support for the frame 54. Mounted upon the rod is a coil spring 56 having an end portion 57 acting against a flange 58 projecting downwardly from the reel frame 54. The opposite end of the spring extends under the adjacent arm 52 as shown in Figs. 3 and 4. The end portion 57 of the spring acts on the flange 58 to swing the frame 54 upwardly and forwardly about its mounting on the rod 55 to the position shown in Fig. 4. Mounted upon the plate 33 as shown in Figs. 1 and 2 is a latch 60 urged by a spring 61 into engagement with an edge of the frame 54 when the latter is in a vertical position. When the button 50 is actuated to rock the bellcrank 42 for disengaging the feed roll 37 from the feed roll 36, the opposite end of the bellcrank acts against the latch 60 for releasing it from the frame 54 so that the latter may be swung outwardly by the spring 56. To effect a release of the latch 60, the member 46 must be moved to a position in which the shoulder of the slot 47 is a little beyond the stud 48 which engages the shoulder to hold the roll 37 in the position of Fig. 2. This results in a freeing of the latch 60 when the member 46 moves back to its latched position, and the latch is operable to engage the reel supporting plate again when moved to its vertical position. To provide for a positive driving of the roll 37 when in feeding position, a gear 63 is arranged on the roll 36 to mesh with a similar gear 64 on the roll 37.

Formed on the reel supporting frame 54 are arms 66 between which a slotted portion 67 (Fig. 7) of a hub 68 on a reel 69 may be inserted. With the supporting frame in the tilted position shown in Fig. 4, the slotted hub may be inserted between the arms until the reel is rotatably supported by the frame at the bottom ends of the arms. The frame is then swung inwardly until it is engaged by the latch 60 and is held by the latter in a vertical position adjacent the plate 33. It will be noted in Fig. 2 that the reel is then supported in a position to receive ribbon passing between the rolls 36 and 37. The arms 66 are arranged at an angle which results in the production of a force holding the reel in position when tension is placed on the ribbon by rotating the reel in a clockwise direction.

The reel 69 comprises a circular flange 71 having at its back side an annular gear portion 72 adapted to mesh with a gear 73 freely mounted on the end of a shaft 74 supporting the power roll 3. Arranged on the shaft 74 is a spring clutch 75 connected at one end to the gear 73 and wound about the shaft from its connected end in a direction opposite to the direction of rotation of the power roll. The turns of the spring have frictional engagement with the shaft 74 and cause the gear 73 to rotate with the shaft as long as the load does not become excessive. When the load becomes too great, the spring 75 expands and permits the gear 73 to remain stationary while the shaft 74 continues to rotate. Formed on the back side of the flange 71 are two lugs or projecting portions 77, each of which is engageable with a finger 78 on the latch member 46 when the latter is in its latching position as shown in Fig. 2. When the reel is supported in a vertical position by the frame 54 as shown in Fig. 1, the gear 73 engages the gear portion 72 and tends to drive the reel in a direction to wind up ribbon. If the ribbon is not connected to the reel and the latch member 46 is depressed, the reel is driven until one of the projections 27 engages the finger 78. At this time, the reel is either in the position shown in Fig. 2 or is in a position rotated 180° from that of Fig. 2. The ribbon may then be easily passed between the feed rolls 36 and 37 and wrapped around one or the other of two pins 80 extending from the face of the flange 71.

Figure 7:
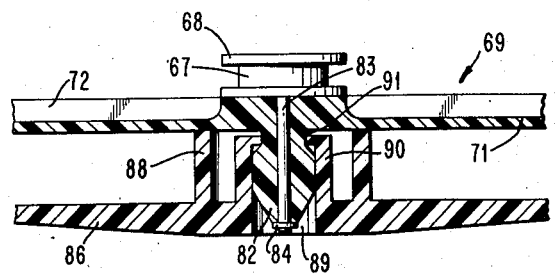
Fig. 7 is a fragmentary sectional view of the ribbon take-up reel taken on line 7—7 of Fig. 2.

Formed on the flange 71, as shown in Fig. 7, is an axially projecting portion 82 which is provided with flat surfaces at its upper and lower sides as shown in Fig. 2. The hub 68 of the reel is attached to a spindle 83 extending axially through the projecting portion 82 and held in place by a C-clip 84. Rotation of the reel 69 on the spindle takes place during ribbon winding operations since the friction at the spindle is less than that between the grooved hub 68 and the frame 54. Opposite the flange 71 is a reel flange 86 which is cut away at its sides adjacent the pins 80, as shown in Fig. 2. Projecting axially from the flange 86 is a hub 88 about which the ribbon may be wound. Formed within the hub 88 is a rectangular opening 89 adapted to receive the projecting portion 82 on the flange 71. The opening is such that it is able to receive the projection 82 only when the cut-out sections in the flange 86 are opposite the pins 80 on the flange 71. Formed integral with the flange 86 are fingers 90, each having a lip at its outer end fitting in a notch 91 at the base of the projection 82 for holding the flanges in the proper spaced relation to form the reel. The outer end of the projection 82 is beveled to cam the fingers apart as the reel is assembled. When the projection has been fully inserted into the opening 89, the fingers flex inwardly to engage their lip portions with the notches 91. The outer edges of the notches are also beveled so that a force to separate the flanges will cause the fingers to be cammed outwardly and permit the reel to be disassembled.

With the reel assembled and the frame 54 in its tilted position shown in Fig. 4, the grooved hub 68 on the reel may be placed between the upper ends of the arms 66 and moved downwardly to its supported position. The tilting of the frame is limited by its flange 58 engaging the lower edge of the plate 33. It will be appreciated that the gear portion 72 on the reel flange 71 is free of the gear 73 when the plate 54 is in its tilted position. Having mounted the reel on its supporting frame, the latter may be swung upwardly to a vertical position in which it is held by the latch 60. The latch member 46 will be in the position shown in Fig. 2 holding the feed roll 37 away from the roll 36. As soon as the reel is moved to its vertical position, the gear portion 72 on the reel engages the gear 73 and is driven by the latter until one of the projections 77 on the reel flange 71 engages the finger 78 on the member 46. The clutch spring 75 then expands and permits the reel to be held in the position shown by Fig. 2. It will be noted that one of the pins 80 is directly below the feed rolls, and the cut-out section of the flange 86 is in position to permit a winding of the ribbon about the pin by the operator. The reel and the mechanism associated therewith remain in the positions shown until the first type key is actuated. As soon as a type key is actuated, the link 25 operates to rock the arm 26 and effect a stepped rotation of the feed roll 36. Extending from the arm 26 is a finger 93 underlying the latch member 46 and operable on an upward swinging of the arm to lift the latch member 46 from its position in Fig. 2 to the position shown in Fig. 5. The lifting of the member 46 results in a release of the projection 77 so that the reel may be driven by the gear 73 to place a tension on the ribbon 38. At the same time, the feed roll 37 is engaged with the roll 36 by a rocking of the bellcrank 42 under the action of the spring 44.

Continued actuation of type bars results in a driving of the feed roll 36 to advance the ribbon through the typewriter. As the ribbon passes from the feed rolls, the reel is rotated to wind up the ribbon and maintain a tension thereon. As soon as the reel is filled with ribbon, the button 50 is actuated to remove the feed roll 37 from the roll 36 and to release the latch 60 so that the frame 54 is swung outwardly by the spring 56. The reel may then be lifted from its supporting plate and have its flanges separated from each other by pulling them apart. The ribbon is then easily shaken from the hub 88, and the flanges may be reassembled so the reel can be used again for winding up more ribbon.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A mechanism for winding ribbon as it is fed through a typewriter comprising, in combination, a reel, a member releasably supporting said reel for rotation, means pivotally supporting said member at one side of the typewriter for movement from a vertical position to a position inclined outwardly from the typewriter, means yieldably urging said member toward its inclined position, a latch adapted to hold said member in its vertical position, driving means engaging said reel when supported in a vertical position and tending to rotate the latter in one direction for winding ribbon, the driving engagement with said reel being broken on movement of said member to its inclined position, and means including an element which is operable manually for releasing said latch to permit movement of said member to its inclined position.

2. In a typewriter having a pair of feed rolls for feeding ribbon therethrough, a mechanism for winding ribbon as it is fed through said typewriter by said pair of feed rolls comprising, in combination, a reel, a member releasably supporting said reel for rotation, means pivotally supporting said member at one side of the typewriter for movement from a vertical position in which said reel is aligned with said feed rolls for receiving ribbon from the latter to a position inclined outwardly from the typewriter, means yieldably urging said member toward its inclined position, a latch engageable with said member for holding it in its vertical position, driving means engaging said reel when supported in a vertical position and tending to rotate the latter for winding ribbon as it is fed by said feed rolls, the driving engagement with said reel being broken on movement of said member to its inclined position, and means including an element which is operable manually for releasing said latch to permit movement of said member to its inclined postion.

3. The mechanism of claim 2 in which said last mentioned means includes a pivotally supported member engageable with said latch, means rotatably mounting one of said feed rolls on said pivotally supported member, a spring urging said pivotally supported member to a position free of said latch and in which the feed roll carried thereby engages the other of said feed rolls, and means connecting said manually operable element to said pivotally supported member to effect a release of said latch and a separation of said feed rolls when said element is operated.

4. The mechanism of claim 2 in which said reel has a hub with a groove extending around its periphery, and said member has an open ended slot adapted to receive the grooved portion of said hub, said reel being rotatably supported by said member at the bottom end of said slot and being removable from said member by movement of the grooved portion of said hub longitudinally of said slot and through the open end of the latter.

5. In a typewriter having a pair of feed rolls for feeding ribbon therethrough, a mechanism for winding ribbon as it is fed through said typewriter by said pair of feed rolls comprising, in combination, a reel, a member releasably supporting said reel for rotation, means pivotally supporting said member at one side of the typewriter for movement between a vertical position in which said reel is aligned with said feed rolls for receiving ribbon from the latter and to a position inclined outwardly from the typewriter, a spring yieldably urging said member toward its inclined position, a latch engageable with said member for holding it in its vertical position, driving means engaging said reel when moved to its vertical position and tending to rotate the latter for winding ribbon as it is fed by said feed rolls, the driving engagement with said reel being broken on movement of said member to its inclined position, a movable member rotatably supporting one of said feed rolls, said movable member operating to effect a release of said latch when moved in a direction to separate its supported feed roll from the other feed roll, means yieldably urging said movable member to a position in which its supported feed roll engages said other feed roll, an element connected to said movable member and operable manually for moving the latter against the action of said yieldable means, and means for latching said element in a position to which it is moved manually for separating one of said feed rolls from the other and effecting a release of said latch.

6. The mechanism of claim 5 in which a portion of one flange on said reel is cut away to a point adjacent its center, a pin extending from the other flange inwardly at a point near the inner edge of said cut-away portion, a projection on said reel engageable with said element when the latter is latched in a position holding one of said feed rolls from the other, said reel being rotated by said driving means when moved to a vertical position, until said projection engages said element, the location of the projection on said reel being such that the cut-away portion of said flange underlies said feed rolls when said projection engages said element, said pin then being in a position under said feed rolls to have said ribbon connected thereto.

7. In a typewriter having a pair of feed rolls for feeding ribbon therethrough, a mechanism for winding ribbon as it is fed through said typewriter by said pair of feed rolls comprising, in combination, a reel, a member releasably supporting said reel for rotation, means pivotally supporting said member at one side of the typewriter for movement from a vertical position in which said reel is aligned with said feed rolls for receiving ribbon from the latter, to a position inclined outwardly from the typewriter, means yieldably urging said member toward its inclined position, a latch engageable with said member for holding it in its vertical position, gear teeth formed on one side of said reel, a gear arranged in a position to be engaged by said gear teeth when said reel is supported in a vertical position, means including a friction clutch for driving said gear, said gear teeth moving out of engagement with said gear when said reel is moved to its inclined position, and means including an element which is operable manually for releasing said latch to permit movement of said member to its inclined position.

8. The mechanism of claim 7 in which said last mentioned means includes a movable member rotatably supporting one of said feed rolls, means connecting said element to said movable member whereby manual operation of said element moves said member from a position in which the feed roll supported thereby engages the other feed roll to a position in which the supported feed roll is free of said other feed roll, means for latching said element in a position holding said supported feed roll free of said other feed roll, and a projection on said reel engageable with said element when the latter is in its latched position and said reel is driven by said gear to a predetermined angular position.

9. The mechanism of claim 8 in which one flange of said reel has a portion cut away to a point adjacent its center, and a pin extending inwardly from the other flange of said reel at a point near the inner edge of said cut-away portion, the location of the cut-away portion on the flange being such that it underlies said feed rolls when said reel projection engages said element, said pin then being in a position to have the ribbon connected thereto after it is passed between said feed rolls.

10. The mechanism of claim 8 including means operable on the actuation of a typewriter key for unlatching said element and effecting a re-engagement of said supported feed roll with said other feed roll.

References Cited in the file of this patent
UNITED STATES PATENTS
2,554,028   Helmond _____ May 22, 1951